(12) United States Patent
Konno et al.

(10) Patent No.: US 7,561,234 B2
(45) Date of Patent: Jul. 14, 2009

(54) LIQUID CRYSTAL DISPLAY DEVICE

(75) Inventors: Takayuki Konno, Kawasaki (JP);
Shinichi Nishida, Kawasaki (JP);
Mamoru Okamoto, Kawasaki (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 145 days.

(21) Appl. No.: 11/074,689

(22) Filed: Mar. 9, 2005

(65) Prior Publication Data
US 2005/0200790 A1    Sep. 15, 2005

(30) Foreign Application Priority Data
Mar. 10, 2004    (JP)    ............... 2004-067334

(51) Int. Cl.
*G02F 1/1343*    (2006.01)
(52) U.S. Cl. ............... 349/141; 349/139; 349/39; 349/38
(58) Field of Classification Search ............... 349/141, 349/139, 39, 38
See application file for complete search history.

(56) References Cited

U.S. PATENT DOCUMENTS 6,184,959 B1 *    2/2001    Izumi .................... 349/124
7,161,641 B2 *    1/2007    Nakayoshi et al. ............ 349/43
2002/0149729 A1 *    10/2002    Nishimura et al. .......... 349/141
2005/0219456 A1 *    10/2005    Tadaki et al. ................ 349/156

FOREIGN PATENT DOCUMENTS

| JP | 10-3092 | 1/1998 |
| JP | 10-20338 | 1/1998 |
| JP | 2001-324725 | 11/2001 |
| JP | 2002-131767 | 5/2002 |
| JP | 2002-131780 | 5/2002 |
| JP | 2002-258321 | 9/2002 |
| JP | 2002-0081133 | 10/2002 |
| JP | 2002323706 | 11/2002 |
| JP | H12-019558 | 1/2003 |
| JP | 2004062145 | 2/2004 |
| KR | H10-307295 | 11/1998 |

* cited by examiner

*Primary Examiner*—David Nelms
*Assistant Examiner*—David Y Chung
(74) *Attorney, Agent, or Firm*—Young & Thompson

(57) ABSTRACT

Lattice-shaped pixel electrodes and lattice-shaped common electrodes are provided on a substrate in which switching elements of a horizontal electric-field liquid crystal display device such as a TFT are formed. Each pixel electrode is integrally formed with one electrode of the switching element such as the TFT. Each pixel electrode has a notch at an external periphery of a horizontal bar of the lattice-shaped pixel electrode. A contact hole connecting the common signal wiring and the common electrode in the substrate is provided in an area of the notch of the pixel electrode.

19 Claims, 11 Drawing Sheets

LIQUID CRYSTAL DISPLAY DEVICE

BACKGROUND OF THE INVENTION

1. Field of the Invention

The present invention relates to a liquid crystal display device, and more particularly to an electrode structure of an active matrix type crystal display device drived by a horizontal electric field.

2. Description of the Prior Art

A twisted nematic (TN) system, which has heretofore been used widely, has a problem that it has a remarkable viewing angle dependency while it has a high contrast because a molecular axis of liquid crystal rises by vertical electric field. In recent years, demand for the liquid crystal display device for use in large-scale monitor such as TVs has been increased, and an In-Plane Switching (IPS) system has been increasingly adopted. In the IPS system, displaying is performed by rotating a molecular axis of liquid crystal on a plane in parallel with a substrate by means of horizontal electric field. Since the IPS system eliminates the viewing angle dependency on a rise-up angle of the molecular axis, the IPS system is more advantageous in its viewing angle property than TN system.

However, in the IPS system, pixel electrodes and common electrodes are formed in a comb shape to apply horizontal electric field. Therefore, the IPS system has problems that a ratio of an electrode area to a display area is high and a ratio of aperture is low.

An example in which such a low aperture ratio of the IPS system is improved is disclosed in Japanese Patent Laid-Open No. 2002-323706. FIG. 1 is a plan view of a liquid crystal display device of an IPS system disclosed in Japanese Patent Laid-Open No. 2002-323706. FIGS. 2A to 2C are section views of a substrate comprising thin film transistors (TFT) (hereinafter referred to as a TFT substrate), which are taken along the lines I-I, II-II and III-III of FIG. 1, respectively.

Referring to FIG. 1 and FIGS. 2A to 2C, a scanning signal wiring 401 made of a first metallic layer and a common signal wiring 402 in parallel therewith are formed on a transparent insulating substrate 400 such as a glass plate. An insulating film 403 is formed on the scanning signal wiring 401 and the common signal wiring 402. A video signal wiring 404 made of a second metallic layer, a TFT 405 (indicated by dotted lines) and a pixel electrode 406 are formed on the insulating film 403. An insulating film 407 is formed on the video signal wiring 404, the TFT 405 and the pixel electrode 406.

Furthermore, an insulating film 408 is coated on the entire of the insulating film 407. On this insulating film 408, a pixel electrode 409 formed of a transparent electrode and a common electrode 410 are formed. The pixel electrode 409 and the common electrode 410 are formed in a comb shape. Note that the arrow solid line of FIG. 1 indicates a rubbing direction of an alignment film (not shown) for defining an initial alignment of liquid crystal.

The video signal wiring 404 is fully covered with the common electrode 410 while interposing the insulating films 407 and 408 therebetween. The pixel electrode 409 and the common electrode 410 are electrically connected to a source electrode 406A and the common signal wiring 402 through contact holes 411 and 412, respectively.

As described above, since the pixel electrode 409 and the common electrode 410, which are comb-shaped, are formed of a transparent electrode, an area on the electrodes also contributes to a ratio of aperture. According to a simulation, if a contribution amount on the transparent electrode is considered, an effective ratio of aperture increases by about 8%.

Because of the structure in which the video signal wiring 404 is covered with the common electrode 410, it is possible to widen an aperture portion to the vicinity of the video signal wiring 404. Note that such a constitution generates a load-carrying capacity between the video signal wiring 404 and the common electrode 410. However, since the common electrode 410 is formed on the video signal wiring 404 with the low dielectric insulating film interposed therebetween, the load-carrying capacity can be controlled within the range of no driving problems.

An example in which a high aperture ratio in an IPS liquid crystal display device is further increased is proposed in Japanese Patent Laid-Open No. 2004-062145. FIG. 3 is a plan view of the IPS liquid crystal display device disclosed in Japanese Patent Laid-Open No. 2004-062145. FIGS. 4A to 4C are section views of a TFT substrate taken along the line I-I, II-II, and III-III of FIG. 3, respectively. Referring to FIG. 3 and FIGS. 4A to 4C, a scanning signal wiring 501 formed of a first metallic layer and a common signal wiring 502 in parallel therewith are formed on a transparent insulating substrate 500 such as a glass plate. An insulating film 503 is formed on the scanning signal wiring 501 and the common signal wiring 502. On the insulating film 503, a video signal wiring. 504 formed of a second metallic layer, a TFT 505 (indicated by a circle of the dotted line) and a pixel electrode 506 integrated with a source electrode are formed. Note that the arrow solid line of FIG. 3 indicates a rubbing direction of an alignment film (not shown) for defining an initial alignment of liquid crystal.

Since the source electrode is formed integrally with the pixel electrode 506, a contact hole for connecting the pixel electrode 506 to the source electrode is unnecessary. An insulating film 507 is formed on the video signal wiring 504, the TFT 505 and the pixel electrode 506 integrated with the source electrode. Furthermore, an insulating film 508 is entirely coated onto the insulating film 507. When a common electrode 510 formed of a transparent electrode is formed on the insulating film 508, a driving voltage is significantly increased because the pixel electrode 506 and the common electrode 510 are formed in a lattice shape such that a plurality of vertical bars are extended between a pair of a horizontal bars, respectively, as shown in FIG. 3 and FIG. 4. Accordingly, the insulating film 508 is left only above the video signal wiring 504 so as to be bank-shaped for the purpose of reducing the load-carrying capacity. Thereafter, the common electrode 510 formed of the transparent electrode is formed. The common electrode 510 is electrically connected to the common signal wiring 502 through the contact hole 512. It does not matter whether the insulating film 508 may be transparent or colored.

Same as in the IPS liquid crystal display device disclosed in Japanese Patent Laid-Open No. 2002-323706, in the IPS liquid crystal display device disclosed in Japanese Patent Laid-Open No. 2004-062145, the video signal wiring 504 is covered with the common electrode 510 while interposing the insulating film 508 therebetween. However, in the IPS liquid crystal display device disclosed in Japanese Patent Laid-Open No. 2004-062145, the common electrode is formed to be bank-shaped, and the video signal wiring 504 has a shape of a cross section surrounded by the common electrode. Accordingly, a shield effect for electric field leaking from the video signal wiring 504 of the IPS liquid crystal display device disclosed in Japanese Patent Laid-Open No. 2004-062145 is stronger than that of the IPS liquid crystal display device disclosed in Japanese Patent Laid-Open No. 2002-323706.

As described above, in the IPS liquid crystal display device disclosed in Japanese Patent Laid-Open No. 2004-062145, the number of the contact holes decreases by one, and a width of a flare of the common electrode extending from an edge of the video signal wiring can be made smaller. Therefore, a higher aperture ratio can be obtained. In the IPS liquid crystal display device, since the pixel electrode is formed of the metallic electrode, a contribution amount to the aperture ratio on the pixel electrode is less than the prior art. However, the IPS liquid crystal display device disclosed in Japanese Patent Laid-Open No. 2004-062145 increases its effective aperture ratio by about 5%, and has an aperture ratio higher than that of the IPS liquid crystal display device disclosed in Japanese Patent Laid-Open No. 2002-323706. Also a vertical crosstalk is suppressed.

In the IPS liquid crystal display devices disclosed in Japanese Patent Laid-Open Nos. 2002-323706 and 2004-062145, when a pixel pitch is large, it is possible to obtain an effective aperture ratio close to that of a TN liquid crystal display device. However, when the pixels are arrayed in a narrower pitch, a size of the contact hole between the common electrode which is the upper layer and the common signal wiring which is the lower layer creates a problem even in the case of the IPS liquid crystal display device disclosed in Japanese Patent Laid-Open No. 2004-062145. Therefore, since the pixel electrode has to be disposed so as to make a detour with a margin from the contact hole, this is contributory to damage the aperture ratio. Since there is a limit to a compact size of the contact hole, the narrower the pitch of the pixel becomes, the less ignorable the influence of the contact hole on the aperture ratio is.

SUMMARY OF THE INVENTION

An object of the present invention is to provide an IPS liquid crystal display device capable of securing an aperture ratio to a maximum extent even in the case where a pixel pitch is narrow and a size of a contact hole between an upper layer common electrode and a lower layer common signal wiring becomes a problem.

A first aspect of a liquid crystal display device of the present invention is a horizontal electric-field liquid crystal display device of an active matrix type comprising a first substrate, a second substrate opposite to the first substrate, and a liquid crystal layer sandwiched between the first and second substrates. It has the following features. Specifically, the first substrate comprises a scanning signal wiring, a video signal wiring, and a thin film transistor at each intersection point of the scanning signal wiring and the video signal wiring. The first substrate has a pixel electrode connected to the thin film transistor, which is formed of a transparent electrode, and a common electrode. The common electrode is disposed above the video signal wiring with an insulating layer interposed therebetween. A common signal wiring is disposed below the video signal wiring with the second insulating layer interposed therebetween. This common signal wiring is electrically connected to the common electrode through a contact hole. The pixel electrode is formed integrally with a source electrode of the thin film transistor. The pixel electrode and the common electrode are formed in a different layer respectively. And the pixel electrode and the common electrode are formed in a lattice shape such that a plurality of vertical bars are extended between a pair of a horizontal bars, respectively. These two electrodes make a pair. A notch is provided at an external periphery of one of the horizontal bars at one end of the pixel electrode. The notch of the pixel electrode is provided near the contact hole.

A second aspect of the liquid crystal display device of the present invention is one in which a horizontal bar is partially cut off to make a vertical bar have an open end of a pixel electrode, instead of a notch positioned at a horizontal bar of the lattice-shaped pixel electrode in the first liquid crystal display device of the present invention. A contact hole, which connects the common electrode to the common signal wiring, is provided near the open end of the vertical bar of the lattice-shaped pixel electrode.

In a second aspect of the liquid crystal display device of the present invention, the video signal wiring, the pixel electrode, and the common electrode of the first substrate are formed to be bent in zigzag.

In the first aspect and the second aspect of the liquid crystal display device of the present invention, the horizontal bar of the lattice-shaped pixel electrode can form storage capacity through the common signal wiring and the second insulating film.

Moreover, in the first and second aspects of the liquid crystal display device of the present invention, a third insulating film is formed on the video signal wiring. The common electrode can be provided so as to extend from an edge of the video signal wiring through the third insulating film.

As described above, the liquid crystal display device of the present invention adopts a structure in which a notch is provided at the horizontal bar of the lattice-shaped pixel electrode formed integrally with the source electrode or a structure in which the vertical bar of the lattice-shaped pixel electrode has the opened end. With this structure, it is possible to get an area allocated to the contact hole. In the liquid crystal display device of the present invention, even when a ratio of the area of the contact hole extended to the pixel becomes larger because of the narrower pixel pitch, the contact hole for connecting the common signal wiring to the common electrode can be easily formed near the notch of the horizontal bar of the lattice-shaped pixel electrode or the opened end of the vertical bar of the lattice-shaped pixel electrode. In the liquid crystal display device of the present invention, it is possible to secure the aperture ratio of the liquid crystal display device to a maximum extent. In the liquid crystal display device of the present invention, the horizontal bar of the lattice-shaped pixel electrodes can form storage capacity together with the common signal wiring and the common electrode respectively through the insulating films.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

Embodiments of the present invention will be concretely described with reference to the accompanying drawings.

Figure 1:
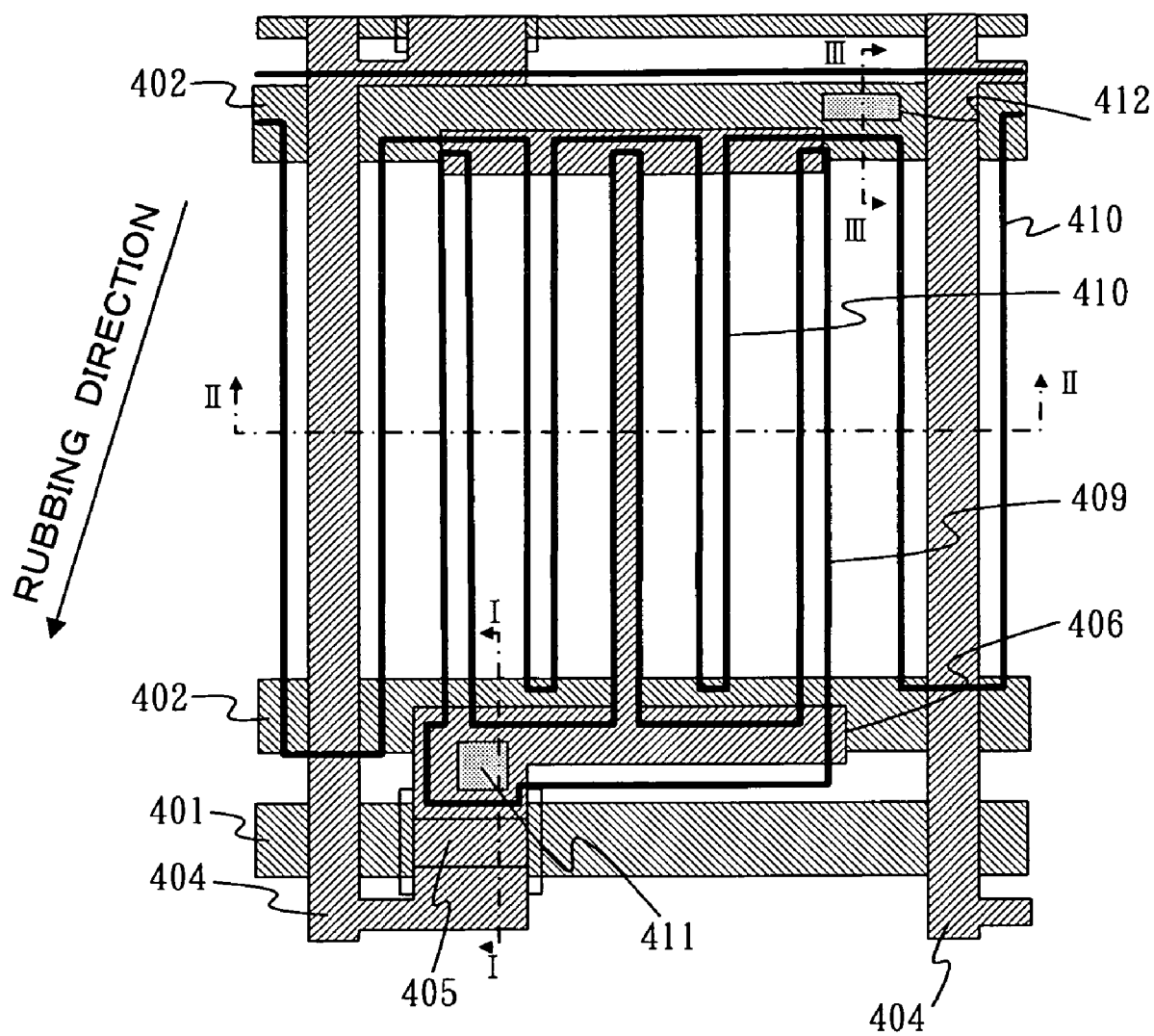
FIG. 1 is a plan view of a conventional IPS liquid crystal display device.
Figure 2A:
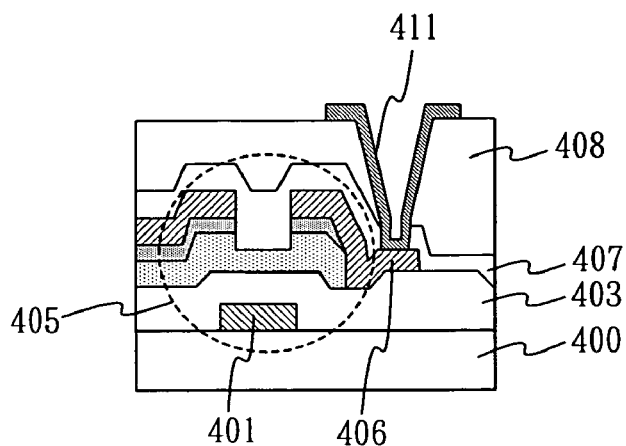
FIGS. 2A to 2C are section views taken along the lines I-I, II-II and III-III of FIG. 1.
Figure 2B:
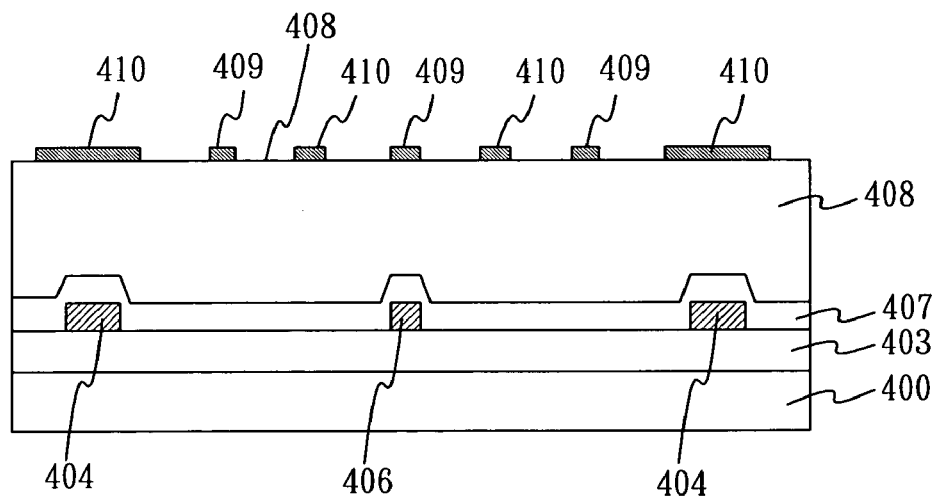
Figure 2C:
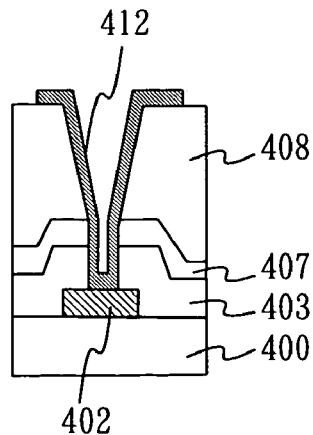
Figure 3:
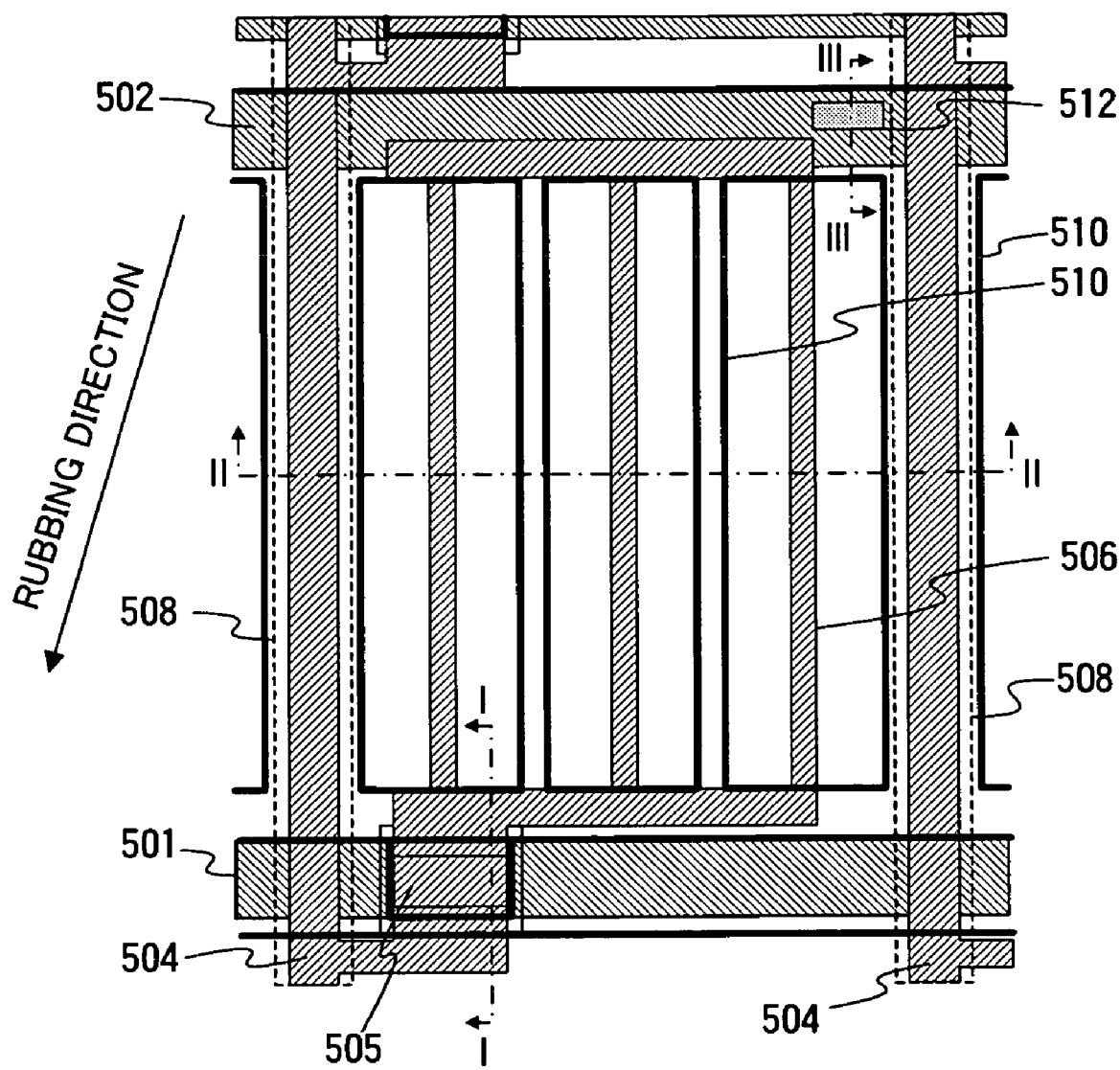
FIG. 3 is a plan view of another conventional IPS liquid crystal display device.
Figure 4A:
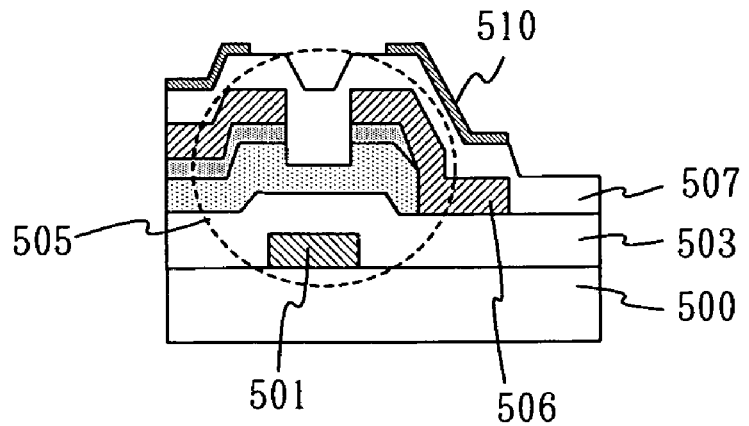
FIGS. 4A to 4C are section views of a TFT substrate taken along the lines I-I, II-II, and III-III of FIG. 3.
Figure 4B:
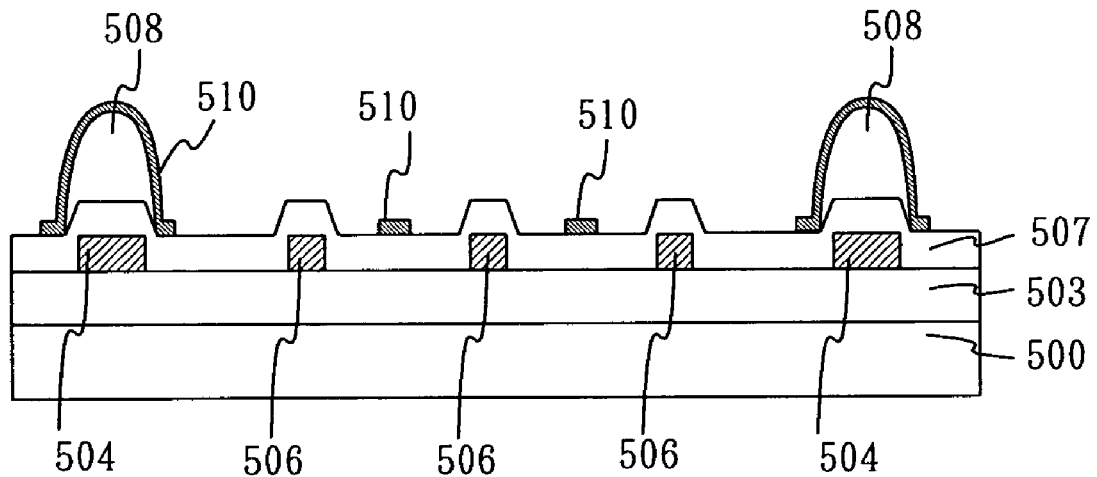
Figure 4C:
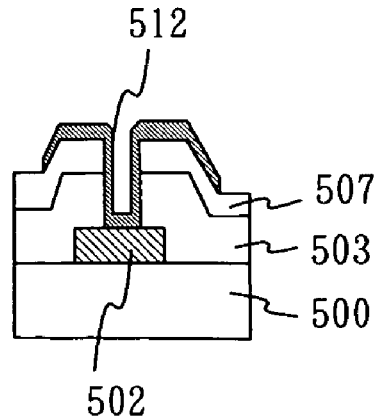
Figure 5:
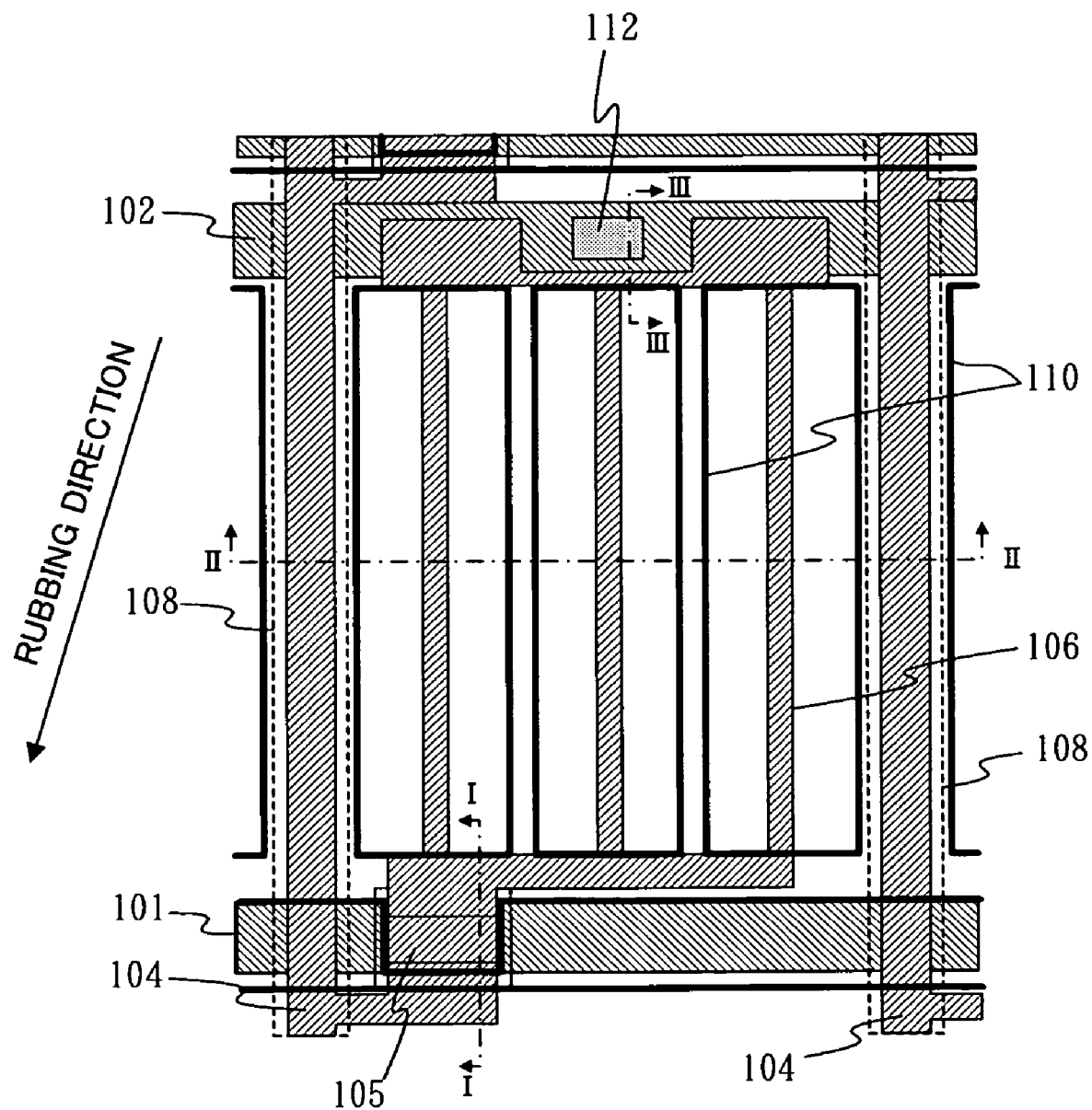
FIG. 5 is a plan view of a liquid crystal display device of a first embodiment of the present invention.
Figure 6A:
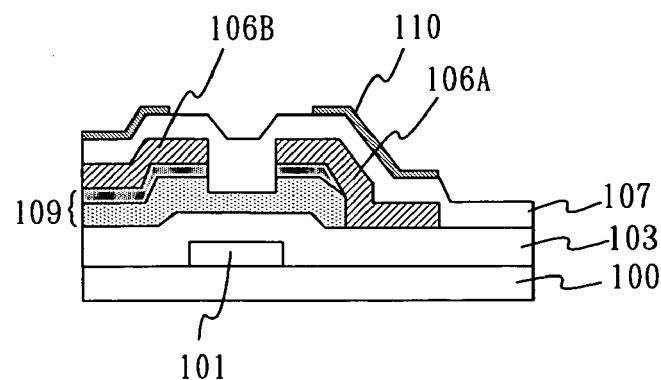
FIGS. 6A to 6C are section views of a TFT substrate taken along the lines I-I, II-II, and III-III of FIG. 5.
Figure 6B:
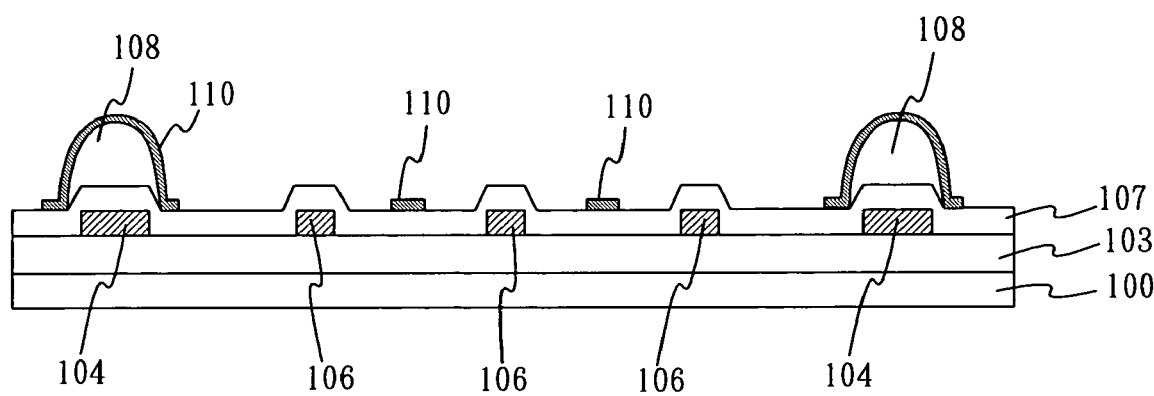
Figure 6C:
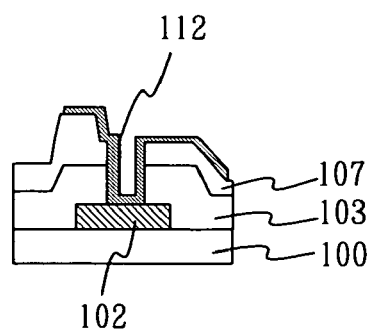

FIG. 5 is a plan view for explaining a first embodiment of a liquid crystal display device of the present invention. FIGS. 6A to 6C show section views of a TFT substrate taken along the lines I-I, II-II, and III-III of FIG. 5, respectively. Referring to FIG. 5 and FIGS. 6A to 6C, a scanning signal wiring 101 formed of a first metallic layer such as Al—Nd and Cr and a common signal wiring 102 in parallel with the scanning signal wiring 101 are formed on a transparent insulating substrate 100 such as a glass plate. On the scanning signal wiring 101 and the common signal wiring 102, an insulating film 103 (gate insulating film) made of SiO2, SiNx and SiOx or the like is formed. On the insulating film 103, a semiconductor layer 109 made of amorphous silicon, a drain electrode 106B and a source electrode 106A are formed, and thus a TFT 105 (switching element) is constituted. The drain electrode 106B is formed of one metallic film selected out of Al, Al alloy, Ag, Ag alloy, Cr and Cr alloy. A video signal wiring 104 and a pixel electrode 106 formed integrally with the source electrode 106A are formed simultaneously with the formation of the source and drain electrodes 106A and 106B. The pixel electrode 106 is formed in a lattice shape such that a plurality of vertical bars are extended between a pair of a horizontal bars, respectively. The semiconductor layer 109 of the TFT is formed in a manner that amorphous silicon is deposited on the entire surface of the insulating film 103 by a Plasma Chemical Vapor Deposition (PCVD) method or the like and patterned. The source electrode 106A, the drain electrode 106B, the pixel electrode 106, the scanning signal wiring 101 and the common signal wiring 102 are formed in a manner that a metallic layer such as Al—Nd, Cr and the like is formed by sputtering and then patterned by a photolithography method. The insulating film 103 is formed by a PCVD method for SiO2, SiNx, SiOx or the like. Note that the arrow solid line of FIG. 5 indicates a rubbing direction of an alignment film (not shown) for defining an initial alignment of liquid crystal.

An insulating film 107 made of SiNx or the like is formed on the video signal wiring 104, the thin film transistor 105 and the pixel electrode 106 formed integrally with the source electrode 106A, and further an insulating film 108 formed of an organic insulating film is coated onto the insulating film 107. The insulating film 108 is left only above the video signal wiring 104 in order to reduce a load-carrying capacity. The insulating film 108 on a display area is removed. Accordingly, it does not matter whether the insulating film 108 may be transparent or colored. As the organic insulating material constituting the insulating film 108, acrylic resin having a dielectric constant, for example, between 3 and 4 can be used, and the insulating film 108 is formed so as to have a thickness of 1.5 to 2 μm.

Thereafter, a common electrode 110 formed of a transparent electrode made of Indium Tin Oxide (ITO) is formed. The common electrode 110 is electrically connected to the common signal wiring 102 through a contact hole 112. In order to shield electric field leaking from the video signal wiring 104, the common electrode 110 is patterned so as to overhang from an edge of the video signal wiring 104. A width of a flare thereof should be equal to 1.5 μm or more, and preferably in a range of about 3 to 4 μm.

In a periphery of the contact hole 112, a notch having a concave shape is provided in an external periphery of the horizontal bar of the lattice-shaped pixel electrode 106 formed integrally with the source electrode 106A. By providing this notch, it is possible to get an area allocated to the contact hole. Then, by providing the notch, even when a ratio of the area of the contact hole extended to the pixel becomes larger because of the narrower pixel pitch, the contact hole for connecting the common signal wiring to the common electrode can be easily formed. It is possible to secure the aperture ratio of the liquid crystal display device to a maximum extent. The horizontal bar of the lattice-shaped pixel electrode 106 forms storage capacity together with the common signal wiring 102 and the common electrode 110 respectively through the insulating films 103 and 107. The common electrode 110 is also formed to be a lattice shape as well as the pixel electrode 106. These electrodes are formed in a different layer respectively.

Figure 11:
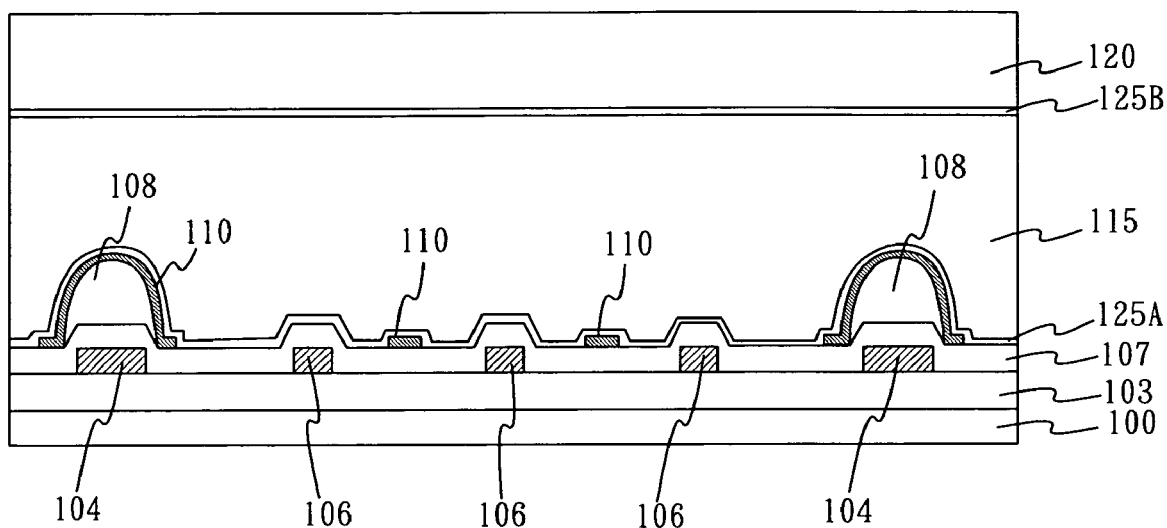
FIG. 11 is a section view showing a structure of the liquid crystal display device of the first embodiment of the present invention.

An opposite substrate comprising a liquid crystal layer and a transparent substrate such as a glass substrate (not shown in FIG. 5 and FIGS. 6A to 6B) is disposed on the common electrode, and thus the liquid crystal display device of the present invention is constituted. FIG. 11 is a section view of a liquid crystal display device of a first embodiment of the present invention. In FIG. 11, the same reference numerals as those of FIG. 6B denote the same constituent components as those of FIG. 6B. Reference numeral 115 of FIG. 11 denotes a liquid crystal layer, and reference numeral 120 denotes an opposite substrate. Note that alignment films 125A and 125B, which are made of such resins as polyimide, are respectively formed on surfaces of the TFT substrates and the opposite substrate of the liquid crystal display device of FIG. 11. The alignments films 125A and 125B are used for defining an initial alignment of the liquid crystal. The arrow solid line indicates a rubbing direction of the alignment film.

Next, a second embodiment of the liquid crystal display device of the present invention will be described with reference to FIG. 7 and FIGS. 8A to 8C. In the liquid crystal display device of this embodiment, the pixel electrode is formed in a lattice shape such that a plurality of vertical bars are extended between a pair of a horizontal bars, respectively. In this embodiment of the liquid crystal display device of the present invention, the horizontal bar at one end of the lattice shaped pixel electrode is cut to make a vertical bar have a open end as shown in FIG. 7.

In this embodiment, a contact hole for connecting the common electrode and the common signal wiring can be more easily provided near the open end of vertical bar of the lattice shaped pixel electrode than the first embodiment.

Figure 7:
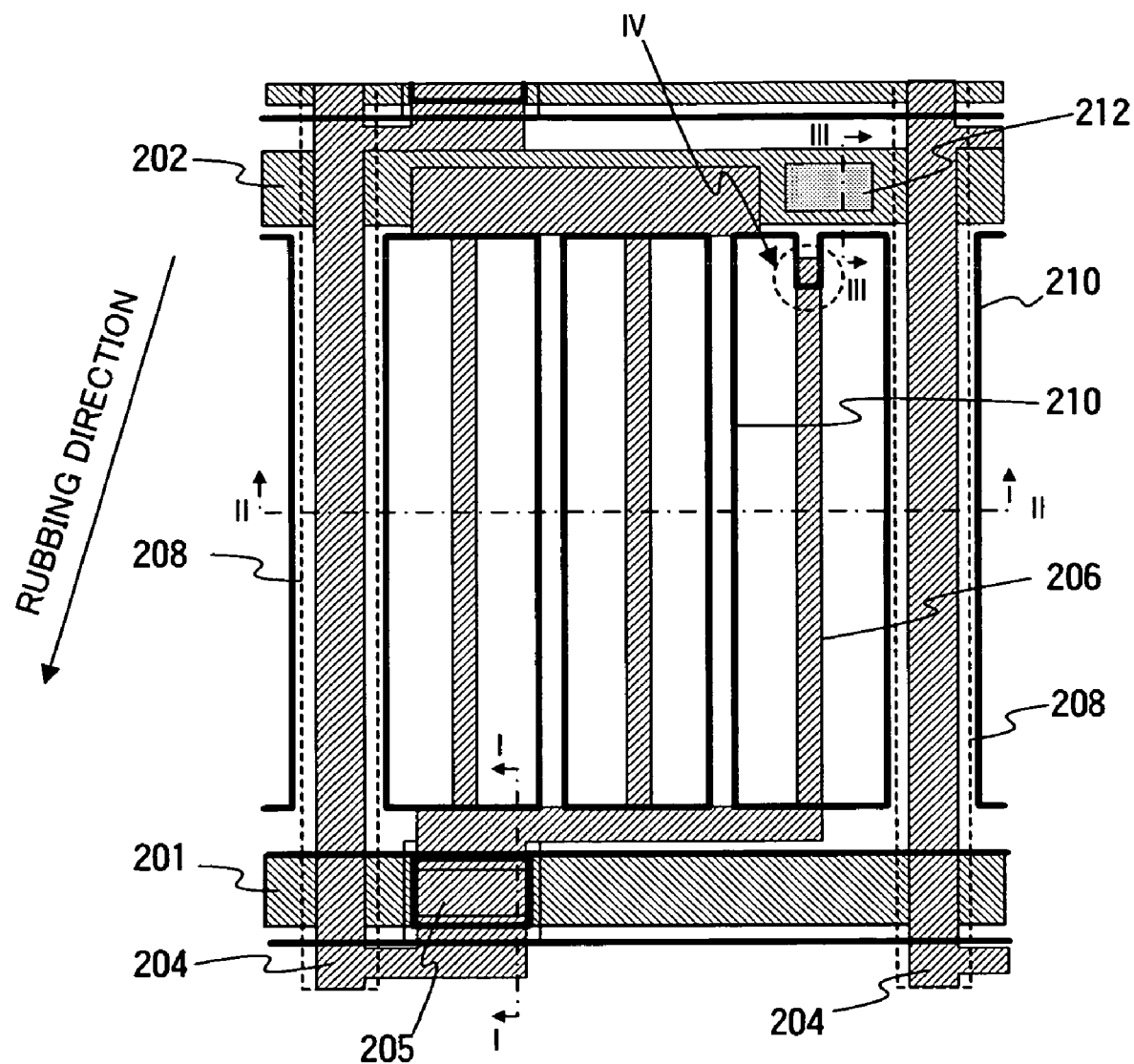
FIG. 7 is a plan view of a liquid crystal display device of a second embodiment of the present invention.
Figure 8A:
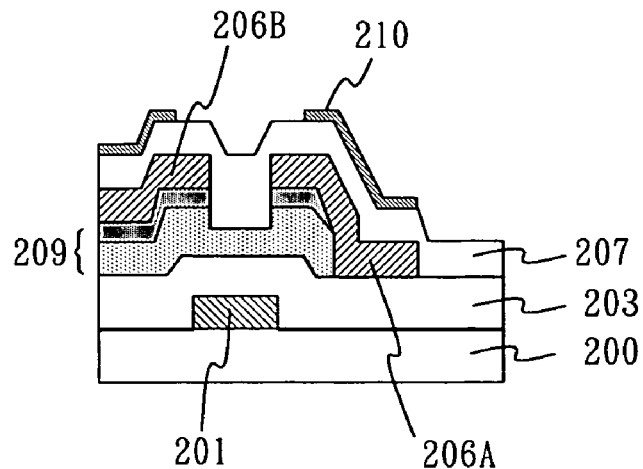
FIGS. 8A to 8C are section views of a TFT substrate taken along the lines I-I, II-II, and III-III of FIG. 7.
Figure 8B:
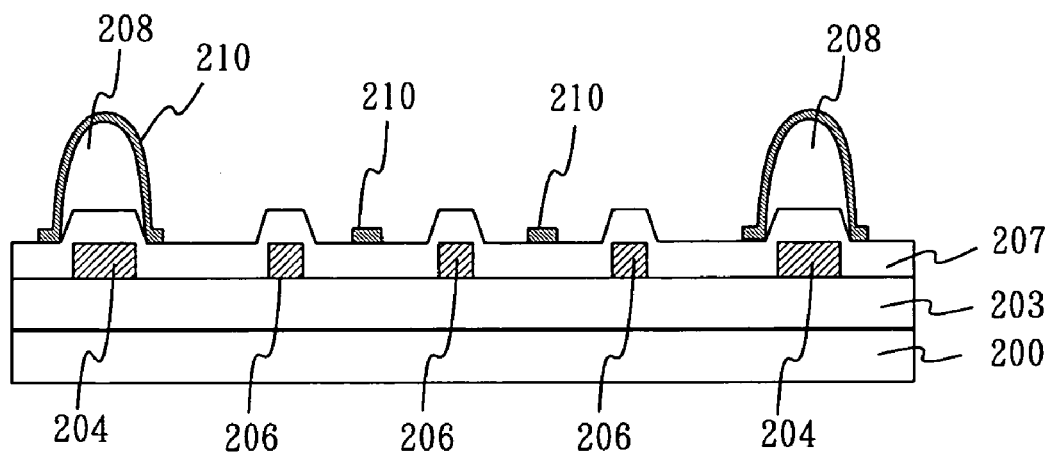
Figure 8C:
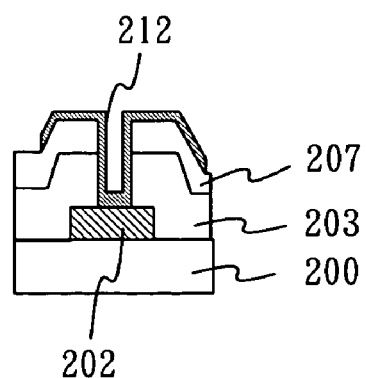

FIG. 7 is a plan view for explaining the second embodiment of the liquid crystal display device of the present invention. FIGS. 8A to 8C are section views of a TFT substrate taken along the lines of I-I, II-II-and III-III, respectively.

Referring to FIG. 7 and FIGS. 8A to 8C, a scanning signal wiring 201 formed of a first metallic layer such as Al—Nd and Cr and a common signal wiring 202 in parallel with the scanning signal wiring 201 are formed on a transparent insulating substrate 200 such as glass. On the scanning signal wiring 201 and the common signal wiring 202, an insulating film 203 (gate insulating film) made of SiO2, SiNx and SiOx or the like is formed. On the insulating film 203, a semiconductor layer 209 made of amorphous silicon, a drain electrode 206B and a source electrode 206A are formed, and thus a thin film transistor (TFT) 205 is constituted. The drain electrode 206B is formed of one metallic film selected out of Al, Al alloy, Ag, Ag alloy, Cr and Cr alloy. A video signal wiring 204 and a pixel electrode 206 formed integrally with the source electrode 206A are formed simultaneously with the formation of the source and drain electrodes 206A and 206B. Note that the semiconductor layer 209 of the TFT is formed in a manner that amorphous silicon is deposited on the entire surface of the insulating film 203 by a PCVD method or the like and patterned. The source electrode 206A, the drain electrode 206B, the pixel electrode 206, the scanning signal wiring 201 and the common signal wiring 202 are formed in a manner that a metallic layer such as Al—Nd, Cr and the like is formed by sputtering and then patterned by a photolithography method. The insulating film 203 is formed by a PCVD method for SiO2, SiNx, SiOx or the like. Note that the arrow solid line of FIG. 7 indicates a rubbing direction of an alignment film.

An insulating film 207 made of SiNx or the like is formed on the video signal wiring 204, the thin film transistor 205 and the pixel electrode 206 formed integrally with the source electrode 206A, and further an insulating film 208 formed of an organic insulating film is coated onto the insulating film 207. The insulating film 208 is left only above the video signal wiring 204 in order to reduce a load-carrying capacity. The insulating film 108 on a display area is removed. Accordingly, it does not matter whether the insulating film 208 may be transparent or colored. As the organic insulating material constituting the insulating film 208, acryl resin having a dielectric constant, for example, between 3 and 4 can be used, and the insulating film 208 is formed so as to have a thickness of 1.5 to 2 μm.

Thereafter, a common electrode 210 formed of a transparent electrode made of ITO is formed. The common electrode 210 is electrically connected to the common signal wiring 202 through a contact hole 212. In order to shield electric field leaking from the video signal wiring 204, the common electrode 210 is patterned so as to overhang from an edge of the video signal wiring 204. A width of a flare thereof should be equal to 1.5 μm or more, and preferably in a range of about 3 to 4 μm.

In a periphery of the contact hole 212, the horizontal bar is partially cut off to make the vertical bar opened end structure (shown by a circle IV of the dotted line) of the lattice-shaped pixel electrode 206. The lattice-shaped pixel electrode 206 is formed integrally with the source electrode 206A. The reason why this unclosed end portion of the vertical bar of the pixel electrode is superposed on the common electrode 210 is to prevent disturbance of the rotation of the liquid crystal molecules due to occurrence of electric field around the end portion thereof in an improper direction.

The liquid crystal display device of the present invention has adopted the structure (open structure) in which the end portion of the vertical bar of the lattice-shaped pixel electrode 206 is not closed in the periphery of the contact hole 212. With this structure, it is possible to get an area allocated to the contact hole. Even when a ratio of the area of the contact hole extended to the pixel becomes larger because of the narrower pixel pitch, the contact hole for connecting the common signal wiring to the common electrode near the lattice-shaped pixel electrode having the unclosed end portion of the vertical bar can be easily formed. Thus, it is possible to secure the aperture ratio of the liquid crystal display device to a maximum extent. The horizontal bar of the lattice-shaped pixel electrode 206 has a role to form storage capacity together with the common signal wiring 202 and the common electrode 210 respectively through the insulating films 203 and 207. By adopting the structure in which the vertical bar of the lattice-shaped pixel electrode is not partially closed, it is possible to suitably adjust the value of the storage capacity.

Although illustrations are omitted in FIG. 7 and FIGS. 8A to 8C, a liquid crystal layer and a second substrate formed of a transparent substrate made of a glass plate or the like are formed on the common electrode, and thus the liquid crystal display device of the present invention is constituted. A section structure of the liquid crystal display device of this embodiment is the same as that of FIG. 11, and the illustration thereof is omitted.

Figure 9:
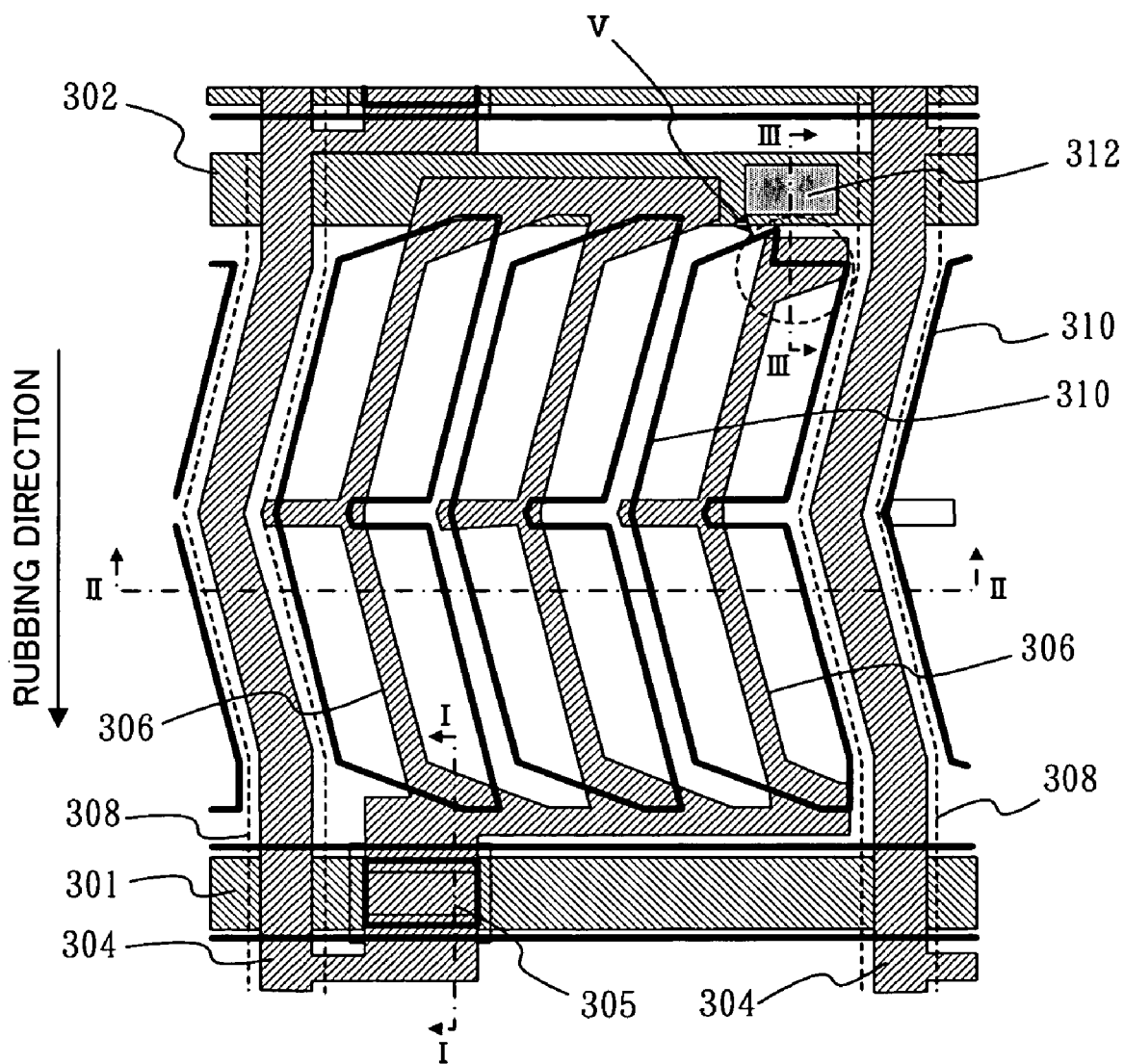
FIG. 9 is a plan view of a liquid crystal display device of a third embodiment of the present invention.
Figure 10A:
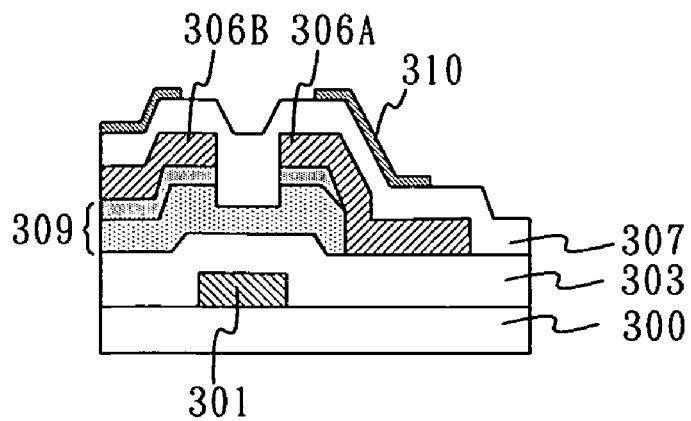
FIGS. 10A to 10C are section views of a TFT substrate taken along the lines I-I, II-II, and III-III of FIG. 9.
Figure 10B:
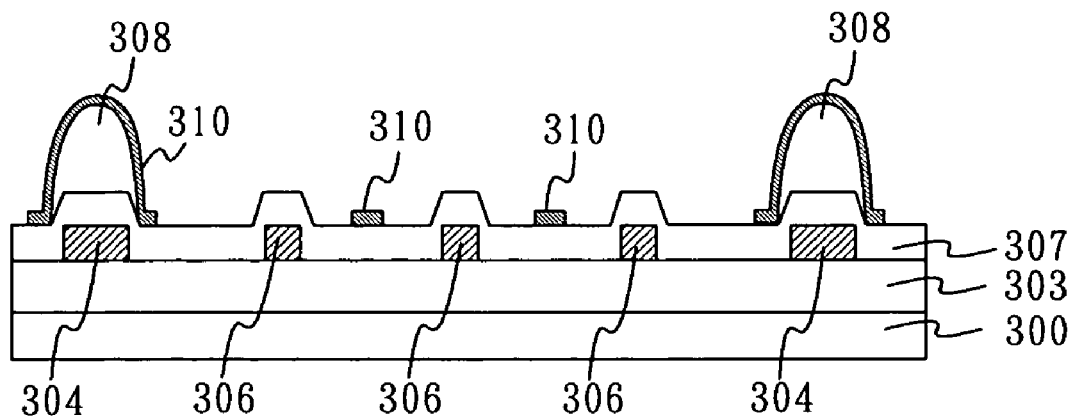
Figure 10C:
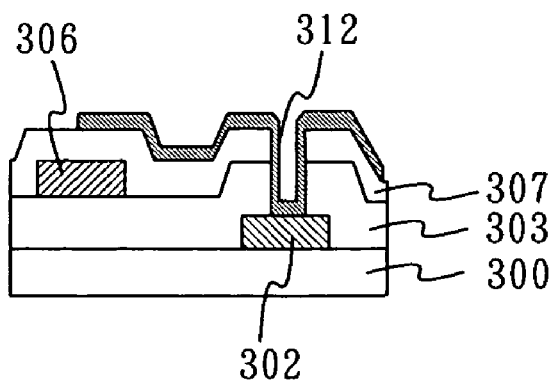

Next, a third embodiment of a liquid crystal display device of the present invention will be described with reference to the accompanying drawings. FIG. 9 is a plan view for explaining the first embodiment of the liquid crystal display device of the present invention. FIGS. 10A to 10C are section views taken along the lines I-I, II-II, and III-III, respectively of FIG. 9. The liquid crystal display device of this embodiment is an example of a so-called multi-domain type in which a video signal wiring, a pixel electrode and a common electrode are bent in zigzag.

Referring to FIG. 9 and FIGS. 10A to 10C, a scanning signal wiring 301 formed of a metallic layer such as Al—Nd and Cr and a common signal wiring 302 in parallel with the scanning signal wiring 301 are formed on a transparent insulating substrate 300 such as glass. On the scanning signal wiring 301 and the common signal wiring 302, an insulating film 303 (gate insulating film) made of SiO2, SiNx and SiOx or the like is formed. On the insulating film 303, a semiconductor layer 309 made of amorphous silicon, a source electrode 306A and a drain electrode 306B are formed, and thus a thin film transistor (TFT) 305 is constituted. The source electrode 306A and the drain electrode 306B are formed of one metallic film selected out of Al, Al alloy, Ag, Ag alloy, Cr and Cr alloy. A video signal wiring 304 and a pixel electrode 306 formed integrally with the source electrode 306A are formed simultaneously with the formation of the source and drain electrodes 306A and 306B. Note that the semiconductor layer 309 of the TFT 305 is formed in a manner that amorphous silicon is deposited on the entire surface of the insulating film 303 by a PCVD method or the like and patterned. The source electrode 306A, the drain electrode 306B, the pixel electrode 306, the scanning signal wiring 301 and the common signal wiring 302 are formed in a manner that a metallic layer such as Al—Nd, Cr and the like is formed by sputtering and then patterned by a photolithography method. The insulating film 303 is formed by a PCVD method for SiO2, SiNx, SiOx or the like.

An insulating film 307 made of SiNx or the like is formed on the video signal wiring 304, the thin film transistor 305 and the pixel electrode 306 formed integrally with the source electrode 306A. Furthermore, an insulating film 308 formed of such as an organic insulating film is coated onto the insulating film 307. The insulating film 308 is left only above the video signal wiring 304 in order to reduce a load-carrying capacity in the same way as the above described liquid crystal display device of the first embodiment of the present invention. The insulating film 308 on a display area is removed. Same as the liquid crystal display device of the first embodiment of the present invention, an organic insulating film such as acryl resin is used for the insulating film 308. A thickness of the insulating film 308 is about 1.5 to 2 μm. The video signal wiring 304 and the pixel electrode 306 are patterned to be bent viewed from above.

Thereafter, a common electrode 310 formed of a transparent electrode made of ITO is formed so as to match the pattern shape of the video signal wiring 304 and the pixel electrode 306, which is bent viewed from above. The common electrode 310 is electrically connected to the common signal wiring 302 through a contact hole 312.

In order to shield electric field leaking from the video signal wiring 304, the common electrode 310 is patterned so as to overhang from an edge of the video signal wiring 304. A width of a flare thereof should be equal to 1.5 μm or more, and preferably in a range of about 3 to 4 μm.

The end portion (shown by a circle V of the dotted line) of the lattice-shaped pixel electrode 306 formed integrally with the source electrode 306A is not closed in the periphery of the contact hole 312. With this structure, it is possible to get an area allocated to the contact hole. Even when a ratio of the area of the contact hole extended to the pixel becomes larger because of the narrower pixel pitch, it is possible to secure the aperture ratio of the liquid crystal display device to a maximum extent. The horizontal bar of the lattice-shaped pixel electrode 306 forms storage capacity together with the common signal wiring 302 and the common electrode 310 respectively through the insulating films 303 and 307. By adopting the structure in which the vertical bar of the lattice-shaped pixel electrode 306 is not partially closed, it is possible to suitably adjust the value of the storage capacity.

Although illustrations are omitted in FIG. 9 and FIGS. 10A to 10C, a liquid crystal layer and a second substrate formed of a transparent substrate made of glass or the like are formed on the common electrode, and thus the liquid crystal display device of the present invention is constituted. A section structure of the liquid crystal display device of this embodiment is the same as that of FIG. 11, and the illustration thereof is omitted.

In this embodiment, the video signal wiring 304, the common signal wiring 302 and the common electrode are bent once when viewed from above, and they may be bent more than once when viewed from above. The rubbing direction of the alignment film (not shown) is made vertical and so that rotation directions of molecule axes of the liquid crystal differ for each domain under and below the apex of the bent portion, as shown by the arrow solid line of FIG. 9. With such constitution, since the liquid crystals can be rotated in two directions, the liquid crystals rotating into the two directions compensate their viewing angle properties mutually. Accordingly, the viewing angle properties can be further improved.

While this invention has been described in connection with certain preferred embodiments, it is to be understood that the subject matter encompassed by way of this invention is not limited to those specific embodiments. On the contrary, it is intended for the subject matter of the invention to include all alternative, modification and equivalents as can be included within the spirit and scope of the following claims.

What is claimed is:

1. A liquid crystal display device, comprising:
   a first substrate including a plurality of scanning signal wirings, a plurality of video signal wirings, a switching element disposed at each of intersection points of the scanning signal wirings and the video signal wirings and a common signal wiring formed below the video signal wirings;
   a second substrate opposite to the first substrate; and
   a liquid crystal layer sandwiched between the first and second substrates,
   wherein the first substrate further includes pixel electrodes and common electrodes which are formed in a lattice shape such that a plurality of vertical bars are extended between a pair of a horizontal bars, respectively, each of the pixel electrodes are formed integrally with each of one electrodes of the switching elements and have a removed portion at an external periphery of one of the horizontal bars, and the common electrodes are connected to the common signal wiring through contact holes located at the horizontal bars of the common electrodes; and
   wherein the removed portion is provided at the horizontal bars of the pixel electrodes near the contact holes, and the horizontal bars of the pixel electrodes form storage capacitors through the common signal wirings and a first insulating foam.

2. The liquid crystal display device according to claim 1, wherein a second insulating layer is formed on the video signal wirings, and the common electrodes are patterned so as to extend from edges of the video signal wirings through the second insulating layer.

3. The liquid crystal display device according to claim 1, wherein the pixel electrodes further have open ends of the vertical bars thereof.

4. The liquid crystal display device according to claim 1, wherein the common signal wiring, the video signal wirings and the pixel electrodes are formed of one metallic film selected out of Al, Al alloy, Ag, Ag alloy, Cr and Cr alloy.

5. The liquid crystal display device according to claim 2, wherein the second insulating layer is formed of acrylic resin.

6. A liquid crystal display device, comprising:
   a first substrate including a plurality of scanning signal wirings, a plurality of video signal wirings, a switching element disposed at each of intersection points of the scanning signal wirings and the video signal wirings and a common signal wiring formed below the video signal wirings;
   a second substrate opposite to the first substrate; and
   a liquid crystal layer sandwiched between the first and second substrates,
   wherein the first substrate further includes pixel electrodes and common electrodes which are formed in a lattice shape such that a plurality of vertical bars are extended between a pair of horizontal bars, respectively, each of the pixel electrodes is formed integrally with each of one electrodes of the switching elements and have a removed portion at an external periphery of one of the horizontal bars, the removed portion being provided at horizontal ends of the pixel electrodes near a cut portion, and the common electrodes are connected to the common signal wiring through contact holes located at the horizontal bars of the common electrodes; and
   wherein the pixel electrodes further have open ends of the vertical bars thereof, the open ends of the vertical bars of the pixel electrodes being provided near the contact holes.

7. The liquid crystal display device according to claim 3, wherein the common electrodes are provided so as to be superposed on the open ends of the vertical bars of the pixel electrodes.

8. The liquid crystal display device according to claim 3, wherein the video signal wirings, the pixel electrodes and the common electrodes are formed to be bent in zigzag.

9. The liquid crystal display device according to claim 6, wherein the horizontal bars of the pixel electrodes form storage capacities through the common signal wirings and a first insulating film.

10. The liquid crystal display according to claim 6, wherein a second insulating layer is formed on the video signal wirings and the common electrodes are patterned so as to extend from edges of the video signal wirings through the second insulating layer.

11. The liquid crystal display device according to claim 6, wherein the common signal wiring, the video signal wirings and the pixel electrodes are formed of one metallic film selected from Al, Al alloy, Ag, Ag alloy, Cr or Cr alloy.

12. The liquid crystal display device according to claim 10, wherein the second insulating layer is formed of acrylic resin.

13. The liquid crystal display device according to claim 6, wherein the common electrodes are provided so as to be superposed on the open ends of the vertical bars of the pixel electrodes.

14. The liquid crystal display device according to claim 6, wherein the video signal wirings, the pixel electrodes and the common electrodes are formed to be bent in zigzag.

15. The liquid crystal display device according to claim 1, wherein the common electrodes are patterned to overhang from an edge of the video signal wirings with a flare having a width of 1.5 μm or more.

16. The liquid crystal display device according to claim 1, wherein the common electrodes are patterned to overhang from an edge of the video signal wirings with a flare having a width of 3 to 4 μm.

17. The liquid crystal display device according to claim 6, wherein the common electrodes are patterned to overhang from an edge of the video signal wirings with a flare having a width of 1.5 μm or more.

18. The liquid crystal display device according to claim 6, wherein the common electrodes are patterned to overhang from an edge of the video signal wirings with a flare having a width of 3 to 4 μm.

19. A liquid crystal display device, comprising:
a first substrate including a plurality of scanning signal wirings, a plurality of video signal wirings, a switching element disposed at each of intersection points of the scanning signal wirings and the video signal wirings, and common signal wirings formed below the video signal wirings;
a second substrate opposite to the first substrate; and
a liquid crystal layer sandwiched between the first substrate and the second substrate,
wherein the first substrate further includes pixel electrodes and common electrodes which are formed in a lattice shape such that a plurality of vertical bars arc extended between a pair of horizontal bars, respectively, each of the pixel electrodes is formed integrally with each of one electrodes of the switching elements and have a removed portion at an external periphery of one of the horizontal bars, and the common electrodes are connected to the co signal wiring through contact holes; and
wherein each of the common signal wirings is located so as to the overlapped with the horizontal bars of the common electrodes and the removed portion is provided at the horizontal bars of the pixel electrodes near the contact holes such that each of the contact holes is located outside of a region between the vertical bars of the pixel electrodes.

* * * * *